(12) United States Patent
Kieu et al.

(10) Patent No.: US 12,313,550 B2
(45) Date of Patent: May 27, 2025

(54) ALL-FIBER SINGLE-CAVITY DUAL-COMB FOR COHERENT ANTI-STOKES RAMAN SCATTERING SPECTROSCOPY BASED ON SPECTRAL FOCUSING

(71) Applicant: ARIZONA BOARD OF REGENTS ON BEHALF OF THE UNIVERSITY OF ARIZONA, Tucson, AZ (US)

(72) Inventors: Khanh Q. Kieu, Tucson, AZ (US); Yukun Qin, I, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 157 days.

(21) Appl. No.: 18/034,450

(22) PCT Filed: Oct. 26, 2021

(86) PCT No.: PCT/US2021/056555
§ 371 (c)(1),
(2) Date: Apr. 28, 2023

(87) PCT Pub. No.: WO2022/093750
PCT Pub. Date: May 5, 2022

(65) Prior Publication Data
US 2023/0400414 A1    Dec. 14, 2023

Related U.S. Application Data

(60) Provisional application No. 63/107,596, filed on Oct. 30, 2020.

(51) Int. Cl.
*G01J 3/44*    (2006.01)
*G01J 3/02*    (2006.01)
(Continued)

(52) U.S. Cl.
CPC ............. *G01N 21/65* (2013.01); *G01J 3/027* (2013.01); *G01J 3/44* (2013.01); *H01S 3/06712* (2013.01);
(Continued)

(58) Field of Classification Search
CPC ... G01N 21/65; G01N 2021/653; G01J 3/027; G01J 3/44; G01J 2003/102;
(Continued)

(56) References Cited

U.S. PATENT DOCUMENTS

| 8,064,053 B2 | 11/2011 | Lee |
| 9,127,985 B2 | 9/2015 | Littleton |

(Continued)

*Primary Examiner* — Abdullahi Nur
(74) *Attorney, Agent, or Firm* — Stuart H. Mayer; Kaplan Breyer Schwarz LLP

(57) ABSTRACT

A method of performing coherent anti-stokes Raman spectroscopy (CARS) includes generating first and second optical pulse trains having different and adjustable repetition rates. One of the pulse trains is directed in a CW direction and the other in a CCW direction. A frequency shift and a first linear chirp is applied to optical pulses in the first optical pulse train. A second linear chirp is applied to optical pulses in the second optical pulse train. The first and second linear chirps having a common chirp rate. One of the chirped optical pulse trains is used as a pump beam and the other is used as a Stokes beam. The first and second chirped optical pulse trains are combined to define a combined beam. The combined beam is provided to a CARS spectroscopic system for exciting a resonant mode in a sample and generating a CARS signal.

16 Claims, 9 Drawing Sheets

(51) Int. Cl.
  *G01N 21/65* (2006.01)
  *H01S 3/067* (2006.01)
  *H01S 3/1118* (2023.01)

(52) U.S. Cl.
  CPC .... *H01S 3/06754* (2013.01); *G01N 2021/653* (2013.01); *H01S 3/1118* (2013.01)

(58) Field of Classification Search
  CPC ............ H01S 3/06712; H01S 3/06754; H01S 3/0092; H01S 3/2391; H01S 3/1608; H01S 3/10046; H01S 3/1618; H01S 3/2375; H01S 3/06791
  See application file for complete search history.

(56) References Cited

U.S. PATENT DOCUMENTS

| | | |
|---|---|---|
| 9,128,059 B2 * | 9/2015 | Langbein ............... G01N 21/65 |
| 2011/0128538 A1 | 6/2011 | Cerullo |
| 2014/0247448 A1 | 9/2014 | Wise et al. |
| 2014/0285873 A1 | 9/2014 | Kieu et al. |
| 2015/0311666 A1 * | 10/2015 | Fermann ............ H01S 3/08013 |
| | | 359/341.1 |
| 2016/0178439 A1 | 6/2016 | Freudiger et al. |

* cited by examiner

ALL-FIBER SINGLE-CAVITY DUAL-COMB FOR COHERENT ANTI-STOKES RAMAN SCATTERING SPECTROSCOPY BASED ON SPECTRAL FOCUSING

BACKGROUND

Coherent anti-Stokes Raman scattering (CARS) spectroscopy is a powerful technique that detects resonant vibrational properties of chemical compounds. This technique can be used to perform chemically selective measurements and imaging to distinguish species that have different Raman spectra. The advantage of CARS is that it is a label-free imaging technique, which can be applied to species that do not fluoresce. In Raman spectroscopy, the "C-H window" is one of the interesting spectral regions that covers from ~2800 to 3100 $cm^{-1}$. In this region, the stretching motion of hydrogen bonds has unique features on the Raman spectrum. Complex laser systems have been developed to perform CARS spectroscopy in the C-H window. Thus, a simple and compact fiber laser source working in this region are useful for studying cells, lipids, and some proteins that have hydrocarbon chains.

Since CARS is a resonant four-wave-mixing process, two light fields (Pump and Stokes) with frequency detuning matching the Raman resonance are usually required. Traditionally, narrowband and tunable lasers are used for CARS spectroscopy. In order to scan multiple Raman resonances, a mechanical scanning stage is often implemented for sweeping the wavelength of the laser, which can be complex, bulky, and sensitive to the surrounding environment.

Super-continuum (SC) generation laser sources, a mature technology for obtaining broad spectrum, have been used for broadband multiplexed CARS spectroscopy without the need for tunable lasers. For instance, a broadband Raman source covering from 0 up to 4000 $cm^{-1}$ using an Er-fiber-laser-driven SC source has been demonstrated in R. Selm, M. Winterhalder, A. Zumbusch, G. Krauss, T. Hanke, A. Sell, and A. Leitenstorfer, "Ultrabroadband background-free coherent anti-Stokes Raman scattering microscopy based on a compact Er: fiber laser system," Opt. Lett. 35, 3282 (2010). The experiment can be done motionlessly if the optimal delay of the probe pulse is known. However, in order to excite the molecules impulsively, the pulses were compressed externally with a compressor before they were delivered to the sample, which reduces robustness and compactness of the fiber laser system. Moreover, in multiplexed CARS spectroscopy, to acquire the broadband Raman signal, a spectrometer or monochromator has to be integrated into the system, which further increases the complexity and cost of the setup.

As an alternative approach, dual-comb based Fourier transform (FT) CARS spectroscopy has been proposed. Dual-comb CARS uses two femtosecond lasers: one acts as the Pump, the other acts as the Probe. The Probe is probing the vibrational coherence from the molecules excited impulsively by the Pump. In the time domain, the modulated oscillation, due to Raman gain induced frequency shift, can be detected with a photodiode. Since this approach is a Fourier transform based spectroscopic technique, the scaled Raman spectrum can be obtained via Fourier transforming the detected time signal. Thus, dual-comb CARS has the advantage of using a single photodiode for detection. In addition, because the dual-comb laser has two pulse trains with slightly different repetition frequencies, the process of detecting the time resolved signal can be entirely motionless. Nevertheless, there are a few drawbacks for this approach. The experiment usually requires two femtosecond laser combs that are electronically locked to each other; the system is complicated and sensitive to the environment. In addition, because of using impulsive Raman scattering, many free-space components are used for compressing the pump pulses to close to transform-limited. For the bandwidth, dual-comb CARS measurements have been done mostly with Ti:sapphire lasers or Yb-fiber laser combs, which only covered the fingerprint window (600-1800 $cm^{-1}$). In order to cover the C-H window, the laser's spectrum had to be nonlinearly broadened with a photonic crystal fiber (PCF) and then the pulses have to be compressed by chirp mirrors.

In another approach, described in K. Chen, T. Wu, T. Chen, H. Wei, H. Yang, T. Zhou, and Y. Li, "Spectral focusing dual-comb coherent anti-Stokes Raman Spectroscopic imaging," Opt. Lett. 42, 3634 (2017), a SF based dual-comb CARS has been demonstrated which works in the fingerprint region with two Yb-fiber laser combs, and a free-space coupled PCF for Stokes generation.

SUMMARY

In accordance with one aspect of the subject matter described herein, an all-fiber dual-comb spectral focusing coherent anti-stokes Raman spectroscopy (CARS) system is provided. The system includes a pulsed laser source having an optical fiber laser cavity configured to generate first and second optical pulse trains having different and adjustable repetition rates. One of the optical pulse trains is directed in a CW direction and the other optical pulse trains is directed in a CCW direction. An optical coupling arrangement is provided for extracting a portion of the first and second optical pulse trains from the optical fiber laser cavity. A first optical fiber path receives the first optical pulse trains from the optical coupling arrangement. The first optical fiber path is configured to apply a frequency shift and a first linear chirp to optical pulses in the first optical pulse train. A second optical fiber path receives the second optical pulse trains from the optical coupling arrangement. The second optical fiber path is configured to apply a second linear chirp to optical pulses in the second optical pulse train. The first and second linear chirps have a common chirp rate. One of the chirped optical pulse trains is used as a pump beam and the other chirped optical pulse train is used as a Stokes beam. An optical combining element is provided for combining the first and second chirped optical pulse trains to define a combined beam. A CARS spectroscopic system receives the combined beam so that the combined beam is directed to a sample for exciting a resonant mode therein and generating a CARS signal.

In one particular embodiment the mode-locked oscillator is a bidirectional ring-cavity erbium fiber laser running at a repetition rate of about 114 MHz. One output of the bidirectional laser is wavelength-shifted from 1560 nm to 1060 nm via supercontinuum generation for use as the pump source. The Raman spectra of various samples such as polystyrene, olive oil, polymethyl methacrylate (PMMA) and polyethylene in the C-H stretching window have been recorded using this particular arrangement.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Figure 1:
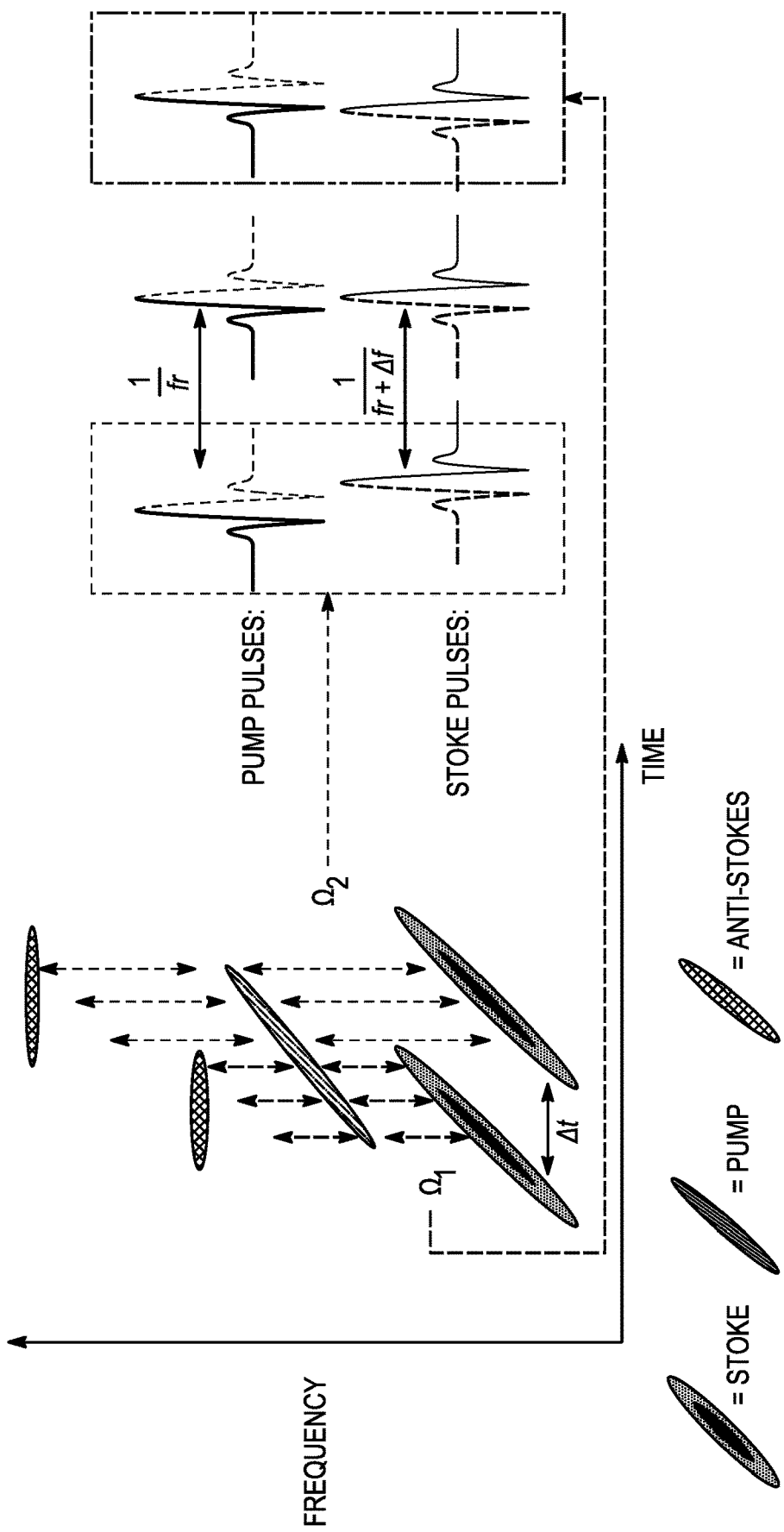
FIG. 1 illustrates the principle of dual-comb based spectral focusing CARS.

Described herein is an all-fiber, single-cavity, free-running dual-comb laser system for CARS spectroscopy based on spectral focusing (SF) technique. The principle of dual-comb based spectral focusing CARS is shown in FIG. 1. Instead of using very short pulses as in FT dual-comb CARS, SF uses chirped pulses as the Pump and Stokes, so a free-space pulse compressor is not required. For SF based CARS, because the Pump field and the Stokes field are linearly chirped with an identical chirp-rate (see FIG. 1), a narrowband instantaneous frequency difference (IFD) is created when the Pump and Stokes are overlapped spatially and temporally. For a dual-comb laser, the Pump field and Stokes field are asynchronous with repetition frequencies $f_r$ and $f_r+\Delta f$, the relative time delay between two fields changes at $$\Delta\tau = \frac{\Delta f}{f_r*(f_r+\Delta f)}$$

for every $$\frac{1}{f_r},$$

which changes the corresponding IFD of the two matched linearly chirped pulses as well. Therefore, multiple Raman states can be excited at the varying relative time delays, and a full scan is completed every $$\frac{1}{\Delta f};$$

The laser system was constructed based on a single-cavity bidirectional mode-locked fiber laser enabled by fiber-taper carbon nanotube saturable absorber technology. Examples of such a laser are described in: K. Kieu, and M. Mansuripur, Opt. Lett. 32, 2242 (2007); K. Kieu, and M. Mansuripur, Opt. Lett. 33, 64 (2008); and S. Mehravar, R. Norwood, N. Peyghambarian, and K. Kieu, Appl. Phys. Lett. 108, 231104 (2016). This design has been used in a free-running dual-comb spectroscopy setup for measuring absorption spectrum of hydrogen cyanide.

In one particular embodiment described in detail herein, the design of the laser cavity is based on erbium fiber technology and operates at about 1.56 μm. More generally, the laser cavity may be based on other technologies and may employ different rare-earth elements and may operate at different wavelengths. In this particular embodiment, one of the laser outputs is frequency shifted to about 1 μm via supercontinuum generation using, for example, a short piece of a highly nonlinear fiber (HNLF). The HNLF may have a conventional circular core-cladding profile, which can be directly spliced to another single mode fiber without using free-space coupling tools.

The 1 μm output arm is used as the Pump field, while the 1.56 μm output arm is used as the Stokes field. The optical frequency difference between the Pump and Stokes can excite the C-H stretching modes. In order to cover the entire C-H window (about 2800 to 3100 cm$^{-1}$), the laser pulses are spectrally broadened and acquire a linear chirp via parabolic generation in normal-dispersion gain fiber. This parabolic generation technique has been used in another SF based stimulated Raman scattering microscopy for generating broadband linearly chirped pulses, which is described in B. Figueroa, W. Fu, T. Nguyen, K. Shin, B. Manifold, F. Wise, and D. Fu, Opt. Express 9, 6116 (2018). In addition, compared to other dual-comb based CARS setups, the laser system described herein can be constructed in an all-fiber format owing to the use of spliceable HNLF for Pump generation and all-fiber amplifier for parabolic linear chirped pulse generation.

Figures 2A, 2B:
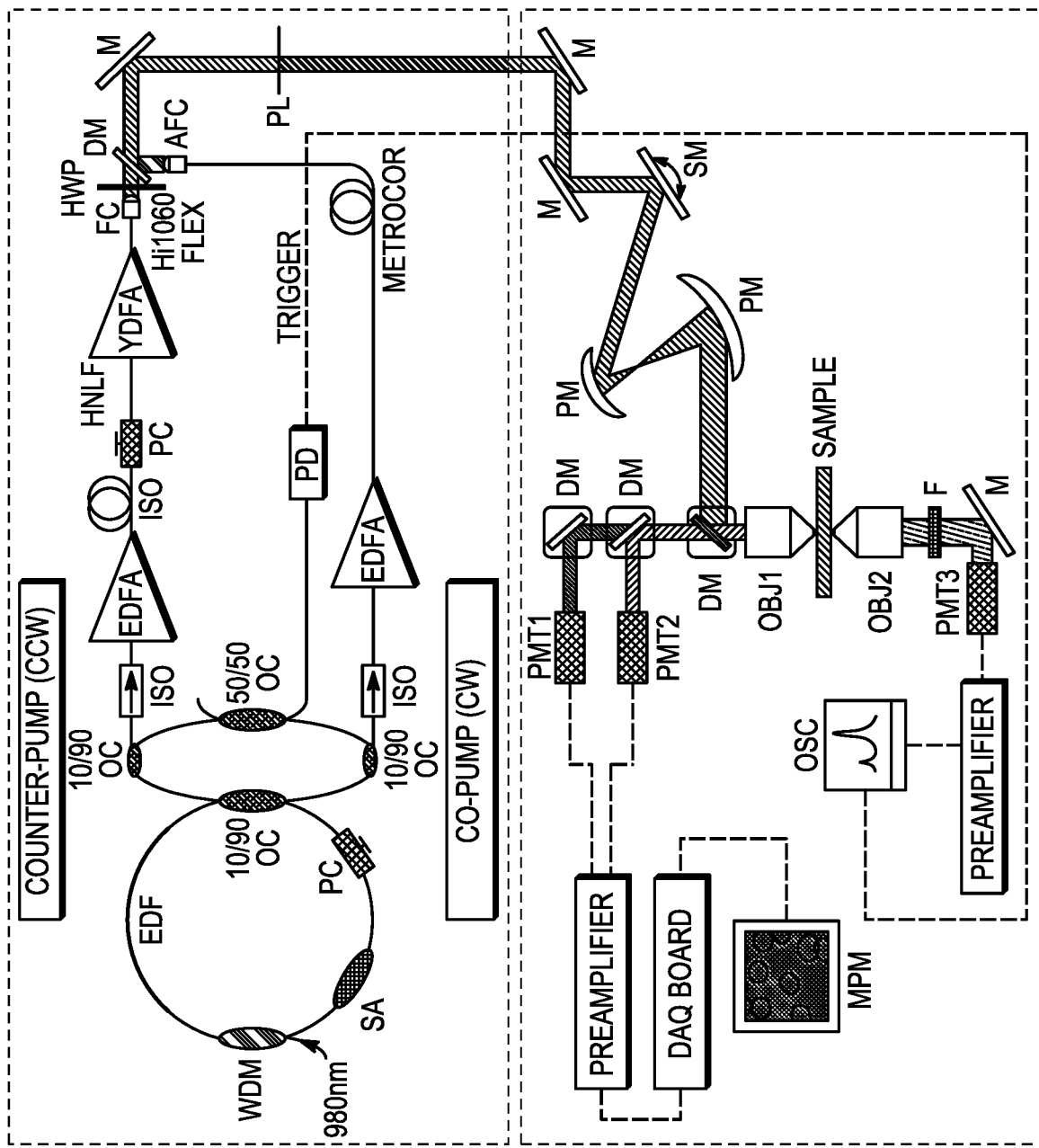
FIG. 2(a) shows a schematic diagram of one embodiment of a free-running dual-comb laser system.
FIG. 2(b) shows a schematic diagram of one embodiment of a CARS spectroscopic and multiphoton microscopic system.

FIG. 2a shows a schematic diagram of the embodiment of the free-running dual-comb laser system described above. The dual-comb laser system includes a bidirectional mode-locked ring laser cavity shown on the left side of FIG. 2(a). The cavity includes a fiber-taper saturable absorber (based, for example, on carbon nanotubes) that permits bidirectional femtosecond pulse generation. A polarization controller (PC) is used to adjust the birefringence of the fiber to optimize the operation of the laser.

More specifically, the free-running bidirectional fiber laser shown in FIG. 2a includes: wavelength division multiplexer (WDM); saturable absorber (SA); polarization controller (PC); Er-doped fiber (EDF); output coupler (OC); isolator (ISO); Er-doped fiber amplifier (EDFA); photodiode (PD); single mode fiber (SMF); highly nonlinear fiber (HNLF); Yb-doped fiber amplifier (YDFA); fiber collimator (FC); adjustable fiber collimator (AFC); half-wave plate (HWP); dichroic mirror (DM); polarizer (PL); and mirror (M).

Figure 3A:
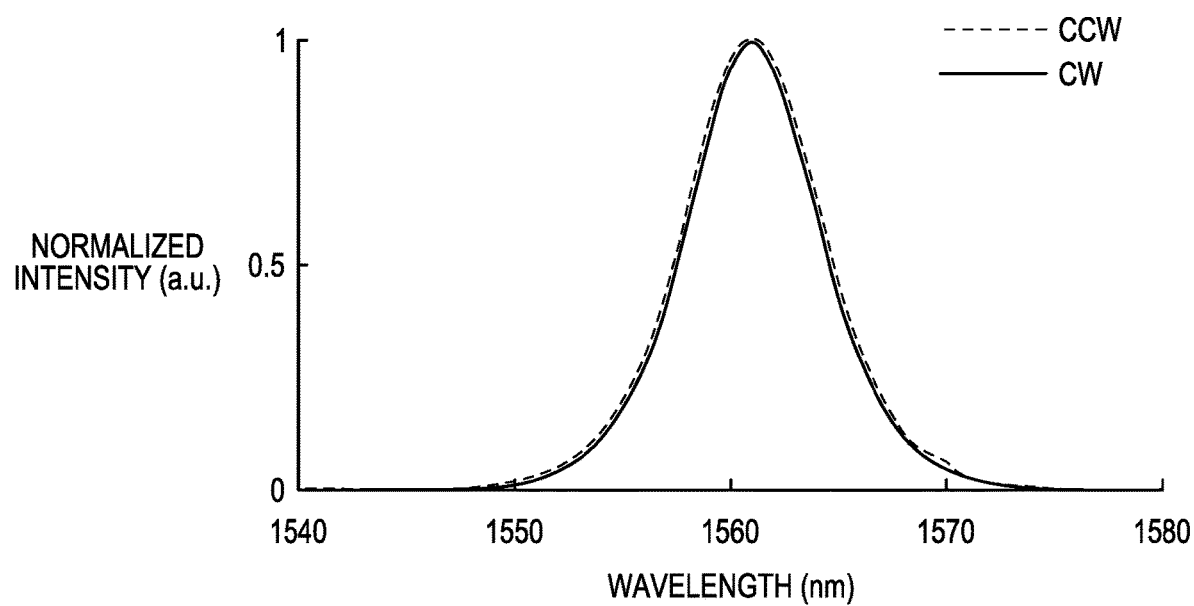
FIG. 3(a) shows the output spectra of the bidirectional laser cavity shown in FIG. 2(a)
Figure 3B:
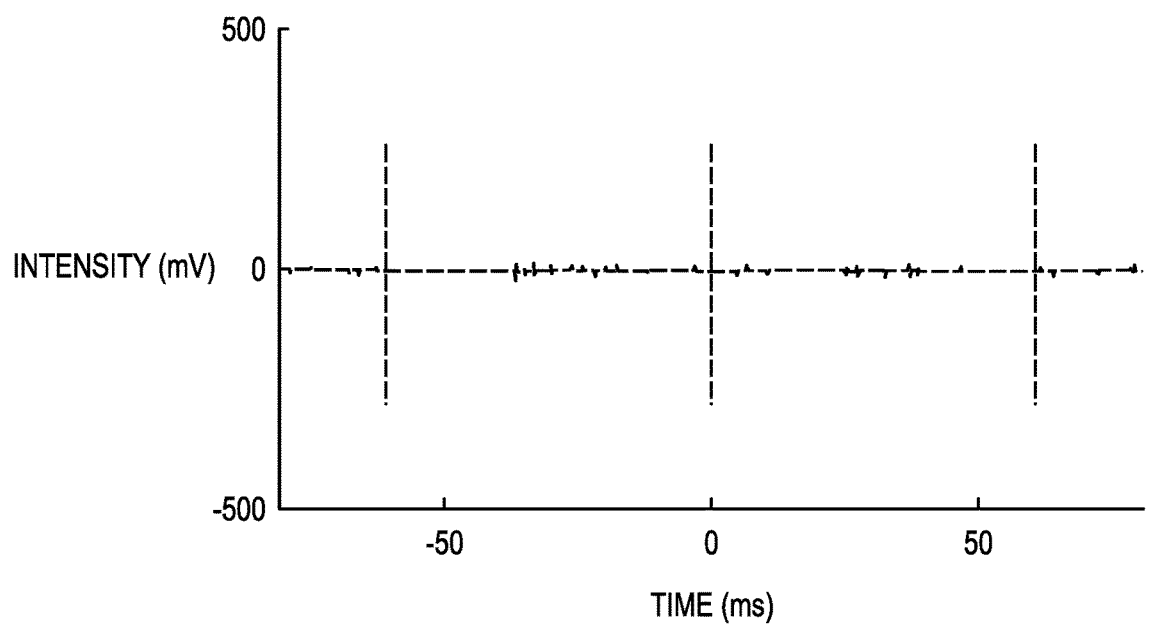
FIG. 3(b) shows an interferogram resulting from the beating of the bidirectional laser outputs on a photodetector.
Figure 3C:
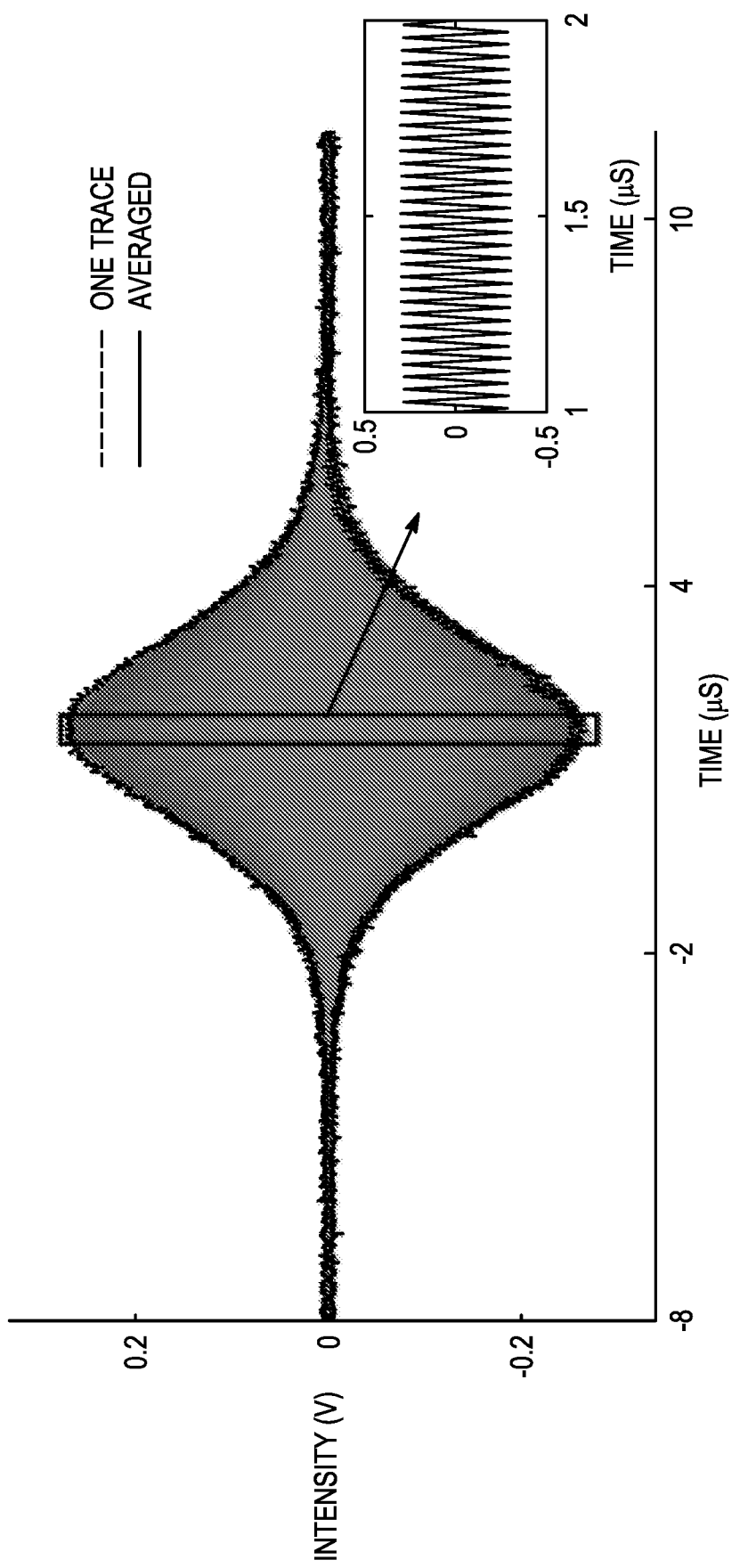
FIG. 3(c) shows a zoom-in of the center part of the averaged interferogram with 8 measurements.

The repetition rate of the laser shown in FIG. 2a is approximately 113.8 MHz. The counter-pump (CCW) direction has output average power ~1.25 mW; the co-pump (CW) direction has output average power ~0.75 mW. The output spectra of the bidirectional laser cavity are plotted in FIG. 3(a). The difference of repetition frequencies ($\Delta f$) between the two directions of the laser cavity can be tuned from ~12 to 41 Hz by adjusting the polarization controller PC in the cavity. At the laser output, a 2×2 90/10 fiber coupler is used to couple out 10% power from each direction. After the output coupler, another 90/10 fiber coupler is used in each direction. The 10 percent ports from the couplers are spliced to a 50/50 fiber coupler to generate an interferogram signal to trigger the time-resolved SF based dual-comb CARS signal. FIG. 3(b) shows an interferogram resulting from the beating of the bidirectional laser outputs on a photodetector. The interferogram corresponds to $\Delta f$ of ~17 Hz. A zoom-in of the center part of the averaged interferogram with 8 measurements is shown in FIG. 3(c).

The 90-percent port of the CW arm is spliced to an erbium-doped fiber amplifier (EDFA). In this particular example the EDFA is made with ~7 m (Coractive EDF-L900) normal-dispersion low gain fiber for parabolic pulse amplification. Approximately ~3 m MetroCor fiber is spliced to the EDFA for further propagation and matching the chirp-rate of the Pump. An FC/APC fiber connector has been made directly at the end of the MetroCor fiber. After the connector, about 120 mW of average output power is obtained. The output is collimated with an adjustable fiber collimator (Thorlabs, CFC11A) to ensure that the 1.56 µm and 1 µm beams are overlapped on same focal plane after the high NA objective (OBJ1) shown in FIG. 2(b).

In FIG. 2(a), the output from the 90-percent port of the CCW arm is spliced to another lab built EDFA to be amplified to about 100 mW. Then, the EDFA output is spliced to ~1.5 m SMF-28 fiber for soliton compression. After the fiber compressor stage, the fiber output is spliced to about 7 cm HNLF to generate 1 µm via SC generation. The splice loss is optimized to be less than 20% between the HNLF and the SMF-28. This approach has been used to build a high-power 1 µm femtosecond laser from a 1.55 µm mode-locked fiber laser in the past. The HNLF output is directly spliced to a ytterbium-doped fiber amplifier (YDFA) and the 1 µm part is amplified to about 100 mW. After the YDFA, about 70 cm Hi1060-flex fiber is used for matching the chirp-rate of the 1.56 µm Pump pulses.

Figure 4A:
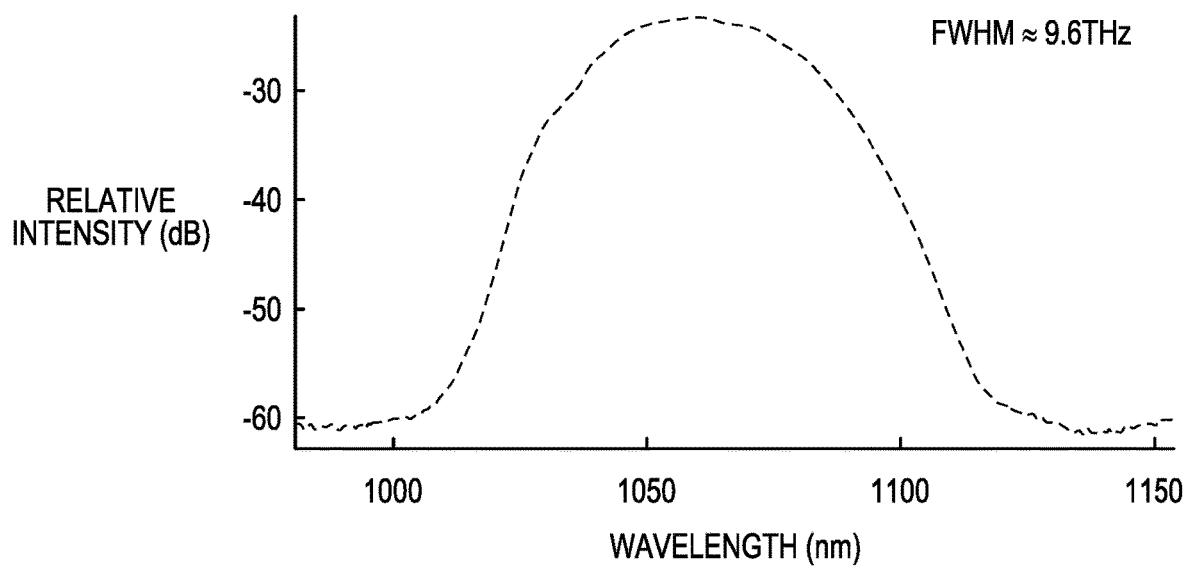
FIG. 4(a) shows the output spectra for the Pump arm (1 μm) of the laser system.
Figure 4B:
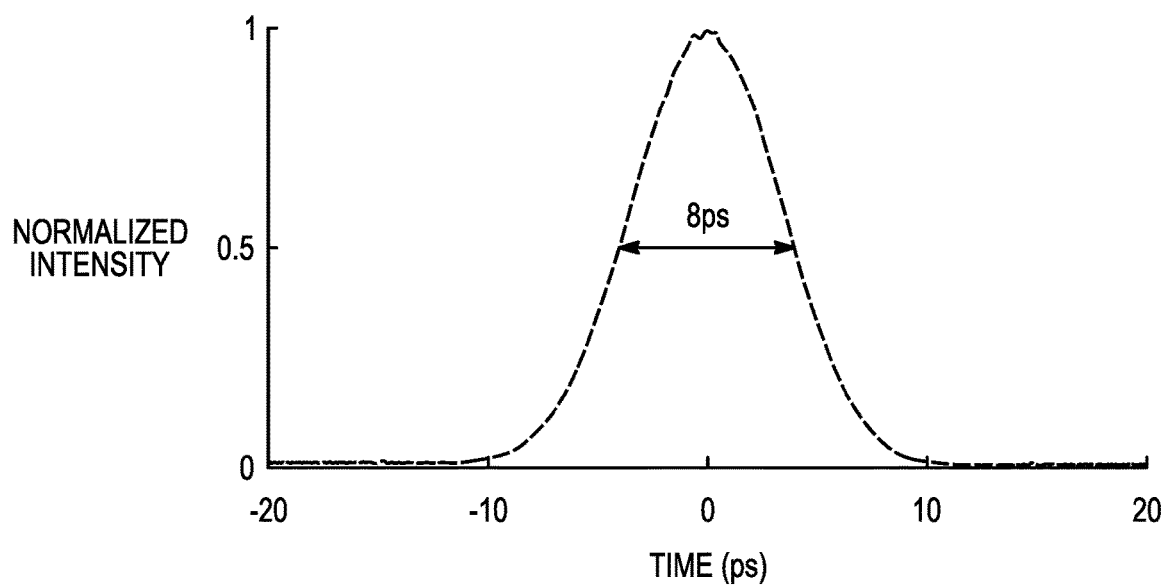
FIG. 4(b) shows the autocorrelation (AC) trace for the 1 μm arm.
Figure 4C:
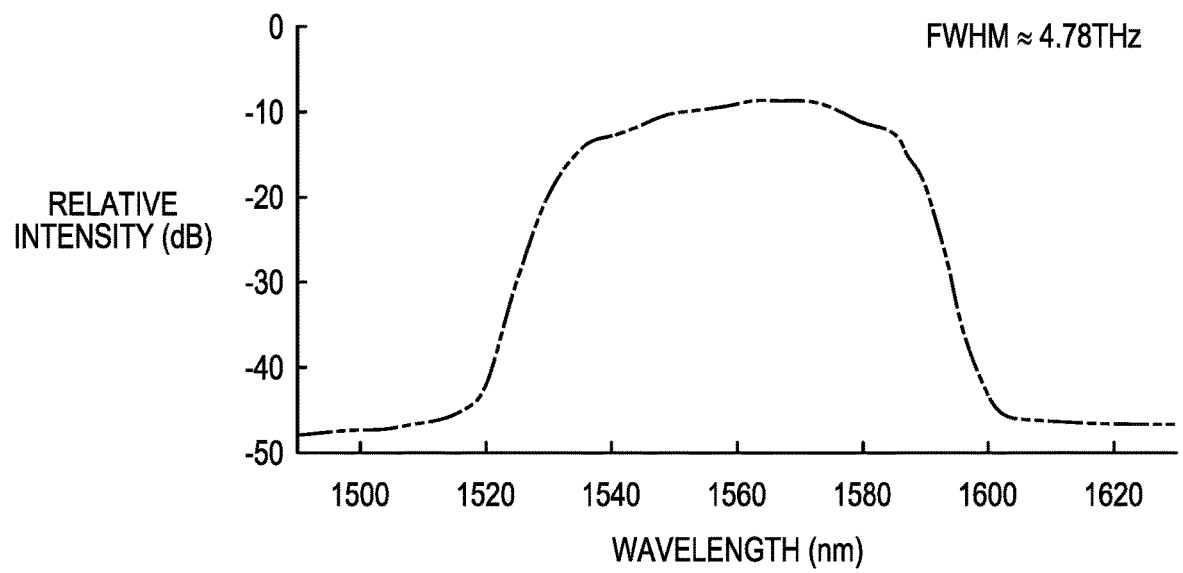
FIG. 4(c) shows the output spectra for the Stokes arm (1.56 μm) of the laser system.
Figure 4D:
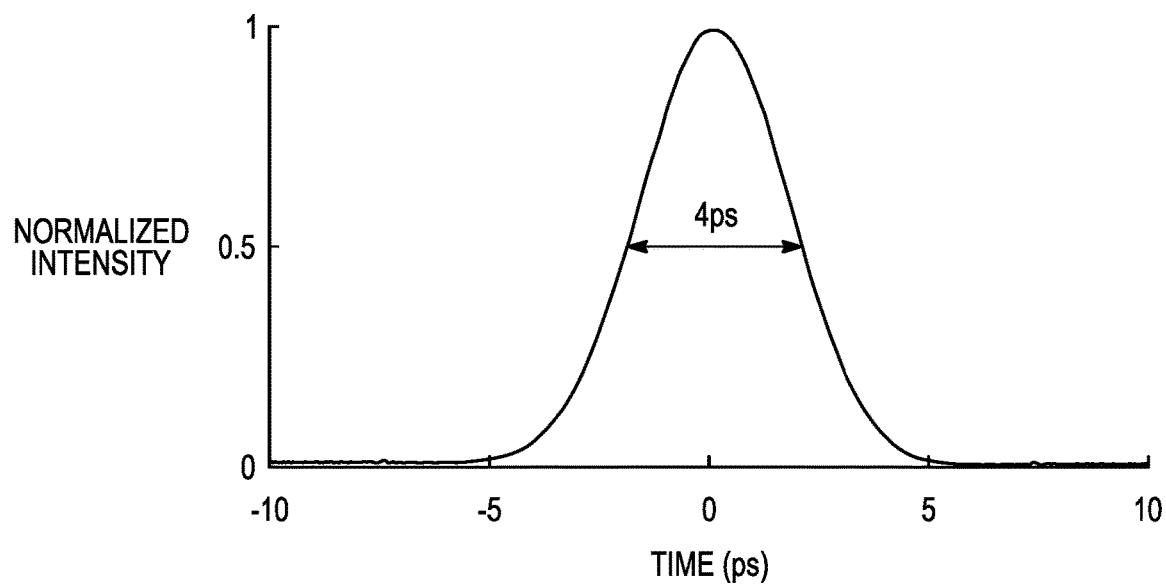
FIG. 4(d) shows the autocorrelation (AC) trace for the 1.56 μm arm.
Figure 5A:
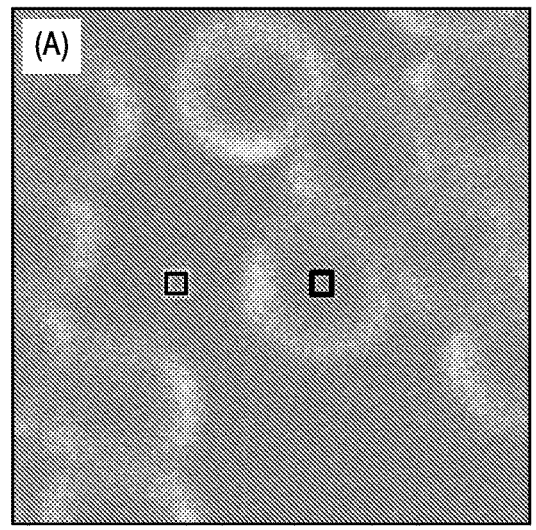
FIG. 5(a) shows a multiphoton image of a polystyrene (PS) bead sample that has been captured from its third harmonic generation (THG) excited by the 1.56 μm pulses.
Figure 5B:
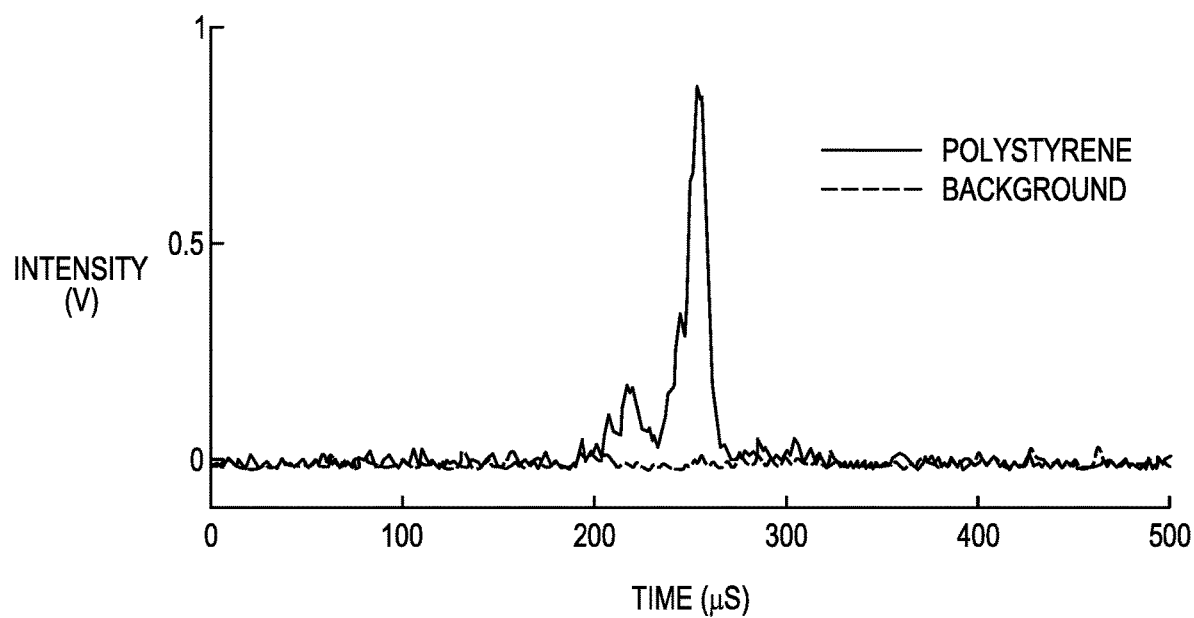
FIG. 5(b) shows the time-resolved CARS spectra from the PS bead of FIG. 5(a)
Figure 5C:
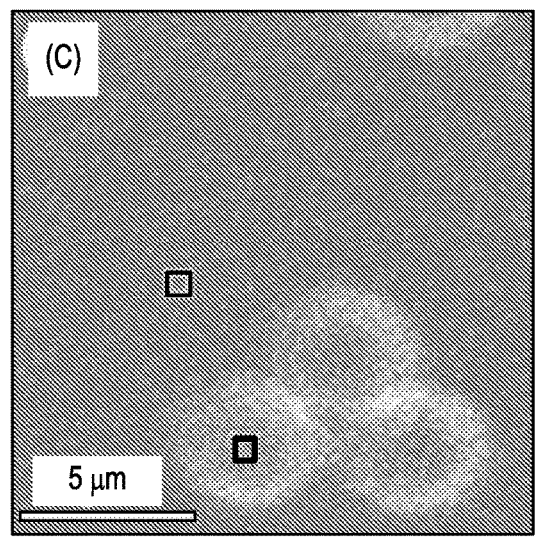
FIG. 5(c) shows a multiphoton image of a PS bead sample immersed in olive oil.
Figure 5D:
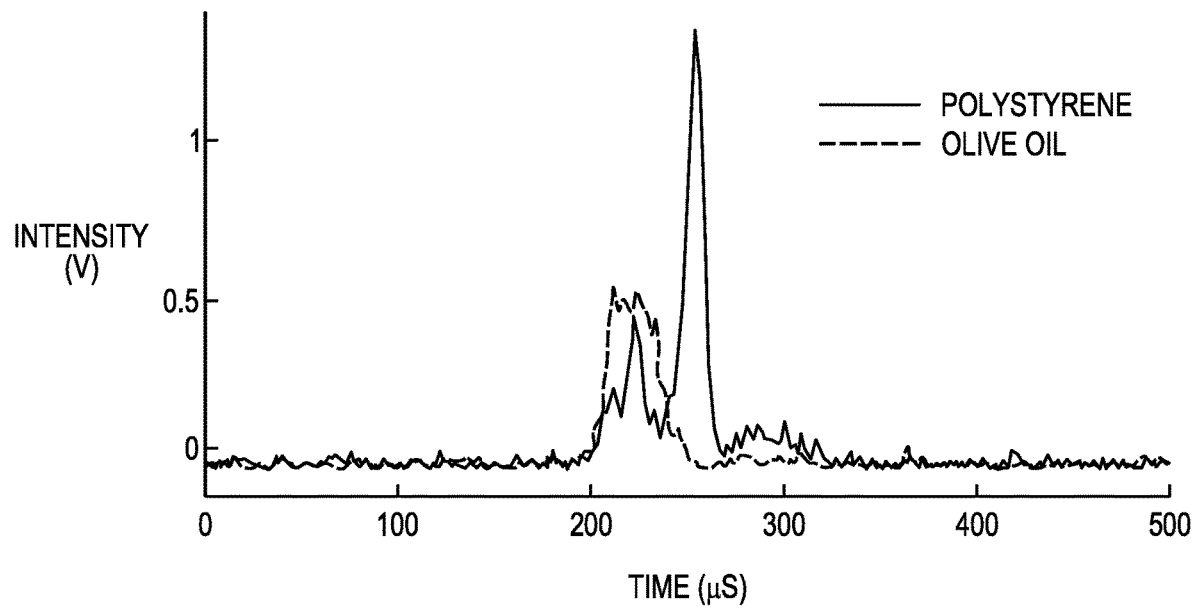
FIG. 5(d) shows the time-resolved CARS spectra from the PS bead immersed in olive oil of FIG. 5(c).

The output spectra for both Pump and Stokes are measured and plotted in FIGS. 4(a) and 4(c), respectively. According to the measurements, the spectral full-width-half-max (FWHM) bandwidth is calculated to be ~9.60 THz for the 1 µm pulses and ~4.78 THz for the 1.56 µm pulses. For spectral focusing, the temporal pulse width of both arms is optimized to have the same ratio of their spectral FWHM bandwidths (9.6 THz/4.78 THz=~2). After the optimization process, the autocorrelation (AC) traces for 1 µm and 1.56 µm are measured and plotted in FIGS. 4(b) and 4(d), respectively. The measured traces show that the ratio of their pulse widths is 8 ps/4 ps=2. The AC traces are not deconvolved because we have assumed that the pulses have similar pulse shapes, so the deconvolution factor will be cancelled out in the calculation. A frequency step for this SF CARS can be obtained by multiplying the chirp-rate and the relative time delay $\Delta\tau$. The resolution of the CARS measurement is approximately equal to the frequency step times the number of pulse pairs that can be resolved by the detection bandwidth ($f_r/f_{detection}$). The optical resolution is determined by the Pump's and Stokes' chirp-rate. According to SF CARS calculation, the optical resolution with the current pulse duration can be ~8 cm$^{-1}$ by assuming a Gaussian pulse shape.

Referring again to FIG. 2a, the optimized 1 µm and 1.56 µm pulses are combined with a dichroic mirror M. A polarizer PL is inserted into the combined beam path to ensure that both 1 µm and 1.56 µm beams are linearly polarized and oriented in the same polarization direction. Then, the combined beam is sent into a CARS spectroscopic and multiphoton microscopic system as shown in FIG. 2(b). The system in FIG. 2(b) includes: scanning mirrors (SM); parabolic mirror (PM); microscope objectives (OBJ1) and (OBJ2); filters (F); photomultiplier tubes (PMT1) and (PMT2); multiphoton image (MPM); and oscilloscope (OSC). The oil immersion objective, OBJ1 in FIG. 2(b), (Olympus, 1.35 NA) is employed for the collinear CARS spectroscopic/imaging system. The average powers on the sample are about 25 mW for the Pump and about 15 mW for Stokes, respectively. The forward emitted CARS signal is collected by a 0.65 NA objective. The collected signal is filtered with an optical filter (FF01-850/310, Semrock) and then detected by a photomultiplier tube PMT (H10720-20, Hamamatsu). The detected CARS signal is amplified in the electrical domain and sent to the oscilloscope OSC to be visualized. In this particular embodiment, the imaging system is designed to be capable of collecting epi-detected multiphoton signals (third and second harmonic generation and multiphoton fluorescence) as well, which can be used to obtain a multiphoton image at the same time as the CARS measurement.

To demonstrate that this laser system is capable of distinguishing different Raman spectra, two polystyrene bead samples (LB30, Sigma Aldrich) have been prepared and studied as shown in FIG. 5. One sample had polystyrene (PS) beads only; another sample featured PS beads immersed in olive oil. In FIG. 5(a), a multiphoton image of the PS bead only sample has been captured from its third harmonic generation (THG) excited by the 1.56 µm pulses. The time-resolved CARS spectra are obtained for both dark background (left-most square in FIG. 5(a)) and the PS bead (right-most square in FIG. 5(a)) and are plotted in FIG. 5(b). For the PS bead only sample, the time-resolved CARS signal only appeared when the laser was focused on the bead, while the signal disappeared as the laser was focused on the air background. As a comparison, we imaged PS beads immersed in olive oil and measured the time-resolved CARS signal. As shown in FIG. 5(d), the time-resolved CARS signals appeared for both PS bead and the olive oil background. The signals appeared at different time delays with respect to the trigger because of the different C-H stretching modes between polystyrene and olive oil.

Figure 6:
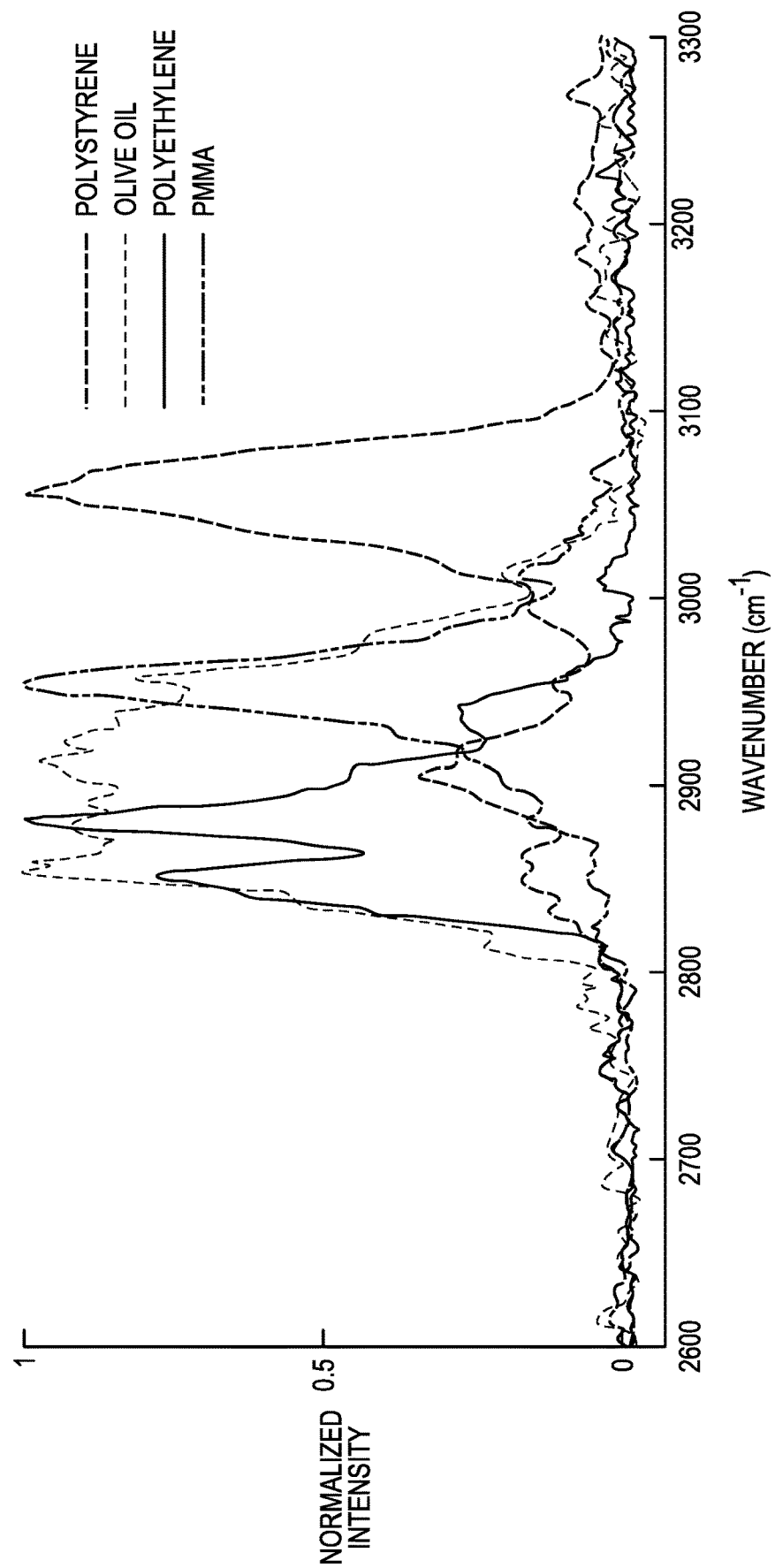
FIG. 6 shows the measured Raman spectra for a PS bead, olive oil, polyethylene microspheres and polymethacrylate (PMMA) microspheres.

Additionally, we imaged polyethylene microspheres (CPMS-0.96, Cospheric) and PMMA microspheres (PMPMS-1.4, Cospheric). The measured Raman spectra are plotted in FIG. 6. Each spectrum was averaged with 8 measurements. For clarity, the spectra are normalized to their peaks. The important features of the Raman spectra are well resolved with the dual-comb laser system. We compared our results with the Raman spectra from published literatures: polystyrene, olive oil, polyethylene, and PMMA. Our spectra show a great similarity with the spontaneous Raman spectra from the above listed references. The signal-noise-ratio (SNR) of the measurement is about 50, and the resolution is about 30 cm$^{-1}$. The resolution of the experiment is currently limited by the sensitivity of the PMT current amplifier (SR570, Stanford Research). In order to resolve the different Raman spectra, we used 10 μA/V gain setting and the low-noise mode of the amplifier. The corresponding bandwidth of the amplifier is about 200 kHz that limits the resolution of the system to about 30 $cm^{-1}$. If the amplifier can resolve 100 pulse pairs (greater than 1.14 MHz) with the same noise level and sensitivity, the resolution could be improved to less than 10 $cm^{-1}$. With the current detection system, reducing the repetition frequency difference Δf to few Hz level may also improve the resolution to close to 10 $cm^{-1}$. Furthermore, making the pulses longer (lower chirp-rate) will be beneficial for improving the resolution as well. However, the longer pulses will have less peak power to excite the sample resulting in lower stimulated Raman signal, which might be detrimental to the SNR.

Those of ordinary skill will recognize that the arrangement of the bidirectional laser system shown in FIG. 2(a) is only illustrative of a variety of different pulsed laser sources that may be employed. For example, in one variant of the particular system shown in FIG. 2(a), normal-dispersion HNLF can be used to generate a flatter SC, with which the bidirectional laser system will be able to measure Raman resonances within the fingerprint window as well (~600 $cm^{-1}$ to 1800 $cm^{-1}$). More generally, however, any pulsed laser source using any suitable technique may be employed. For instance, directly modulated lasers or mode-locked lasers may be used in some embodiments. The pulsed laser source may be mode-locked by either an active mode-locking technique or a passive mode-locking technique. In active mode-locking, an external signal drives a modulator that modulates the light in the laser cavity. The modulator is typically located within the laser cavity itself. In passive mode-locking an element is placed in laser cavity which causes self-modulation of the light. For instance, in one example, such as in the bidirectional fiber laser in FIG. 2(a), the element may be a saturable absorber, which has an intensity dependent transmission response. In general, passive mode-locking may be achieved using others suitable elements instead of a saturable absorber including, for instance, a semiconductor saturable absorber mirror (Sesam) or an arrangement that employs a nonlinear polarization evolution (NPE) mechanism. Moreover, the operating frequencies specified above for the bidirectional laser system are shown for illustrative purposes only. More generally, the laser may operate at any frequencies that are suitable for any particular application.

Likewise, those of ordinary skill also will recognize that the arrangement of the bidirectional laser system shown in FIG. 2(b) is only illustrative of a variety of different CARS spectroscopic systems that may be employed.

In summary, an all-fiber, single-cavity, free-running dual-comb laser system has been constructed for spectral focusing CARS spectroscopy. The system has been demonstrated with measurements made with polystyrene, olive oil, polyethylene, and PMMA. The C-H stretching signals have been observed in wavenumber window ~2800 to 3100 $cm^{-1}$. The laser system has been made without compromising the all-fiber format. Among many other things, this system may be employed for Raman spectroscopy and label-free imaging in many practical applications.

The above description of illustrated examples of the present invention is not intended to be exhaustive or limited to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An all-fiber dual-comb spectral focusing coherent anti-stokes Raman spectroscopy (CARS) system, comprising:
    a pulsed laser source having an optical fiber laser cavity configured to generate first and second optical pulse trains having different and adjustable repetition rates, one of the first and second optical pulse trains being directed in a CW direction and the other of the first and second optical pulse trains being directed in a CCW direction;
    an optical coupling arrangement for extracting a portion of the first and second optical pulse trains from the optical fiber laser cavity;
    a first optical fiber path for receiving the first optical pulse trains from the optical coupling arrangement, the first optical fiber path being configured to apply a frequency shift and a first linear chirp to optical pulses in the first optical pulse train;
    a second optical fiber path for receiving the second optical pulse trains from the optical coupling arrangement, the second optical fiber path being configured to apply a second linear chirp to optical pulses in the second optical pulse train, the first and second linear chirps having a common chirp rate, one of the first and second chirped optical pulse trains being for use as a pump beam and the other of the first and second chirped optical pulse trains being for use as a Stokes beam;
    an optical combining element for combining the first and second chirped optical pulse trains to define a combined beam; and
    a CARS spectroscopic system receiving the combined beam so that the combined beam is directed to a sample for exciting a resonant mode therein and generating a CARS signal.

2. The system of claim 1, wherein the first optical fiber path includes a highly nonlinear fiber for applying the frequency shift via supercontinuum generation.

3. The system of claim 1, wherein the first and second linear chirps are applied with non-zero dispersion shifted optical fibers.

4. The system of claim 1, wherein the pulsed laser source is a mode-locked laser.

5. The system of claim 4, wherein the mode-locked laser is a passively mode-locked laser.

6. The system of claim 4, wherein the pulsed laser source is an actively mode-locked laser.

7. The system of claim 4, wherein the mode-locked laser includes a rare-earth doped fiber gain medium.

8. The system of claim 7, wherein the rare-earth doped fiber gain medium includes erbium.

9. The system of claim 4, wherein the mode-locked laser includes a polarization controller for adjusting a repetition rate of the first and second optical pulses.

10. A method of performing coherent anti-stokes Raman spectroscopy (CARS), comprising:

generating first and second optical pulse trains having different and adjustable repetition rates, one of the first and second optical pulse trains being directed in a CW direction and the other of the first and second optical pulse trains being directed in a CCW direction;

applying a frequency shift and a first linear chirp to optical pulses in the first optical pulse train;

applying a second linear chirp to optical pulses in the second optical pulse train, the first and second linear chirps having a common chirp rate, one of the first and second chirped optical pulse trains being used as a pump beam and the other of the first and second chirped optical pulse trains being used as a Stokes beam;

combining the first and second chirped optical pulse trains to define a combined beam; and providing the combined beam to a CARS spectroscopic system for directing the combined beam to a sample for exciting a resonant mode therein and generating a CARS signal.

11. The method of claim 10, wherein the generating is performed by a mode locked laser.

12. The method of claim 11, wherein the mode-locked laser is a passively mode-locked laser.

13. The method of claim 11, wherein the mode-locked laser is an actively mode-locked laser.

14. The method of claim 11, wherein the mode-locked laser includes a rare-earth doped fiber gain medium.

15. The method of claim 14, wherein the rare-earth doped fiber gain medium includes erbium.

16. The method of claim 11, wherein the mode-locked laser includes a polarization controller for adjusting a repetition rate of the first and second optical pulses.

* * * * *